United States Patent
Wu (10) Patent No.: US 10,459,245 B2
(45) Date of Patent: Oct. 29, 2019

(54) FLEXIBLE TEMPLE STRUCTURE

(71) Applicant: Chien-Liang Wu, Tainan (TW)

(72) Inventor: Chien-Liang Wu, Tainan (TW)

(*) Notice: Subject to any disclaimer, the term of this patent is extended or adjusted under 35 U.S.C. 154(b) by 0 days.

(21) Appl. No.: 15/597,940

(22) Filed: May 17, 2017

(65) Prior Publication Data
US 2018/0335644 A1 Nov. 22, 2018

(51) Int. Cl.
*G02C 5/14* (2006.01)
*G02C 5/00* (2006.01)
*G02C 3/00* (2006.01)
*G02C 5/22* (2006.01)

(52) U.S. Cl.
CPC .......... *G02C 5/2209* (2013.01); *G02C 5/146* (2013.01); *G02C 2200/04* (2013.01); *G02C 2200/08* (2013.01)

(58) Field of Classification Search
CPC . G02C 5/20; G02C 5/143; G02C 5/00; G02C 5/16; G02C 5/006; G02C 5/22; G02C 1/02; G02C 11/00; G02C 7/02; G02C 7/04; G02C 11/10; G02C 5/146; G02C 11/04; G02C 2200/02; G02C 2200/08
USPC .......... 351/118, 111, 41, 114–116, 119, 121, 351/123, 140, 158, 159.73–159.75, 178
See application file for complete search history.

(56) References Cited

U.S. PATENT DOCUMENTS

| | | | | |
|---|---|---|---|---|
| 4,968,129 A | * | 11/1990 | Grendol | G02C 5/2209 16/228 |
| 2006/0139567 A1 | * | 6/2006 | Toulch | G02C 1/02 351/41 |
| 2014/0333888 A1 | | 11/2014 | Tsai | |

FOREIGN PATENT DOCUMENTS

TW          M463361 U      10/2013

* cited by examiner

*Primary Examiner* — Dawayne Pinkney
(74) *Attorney, Agent, or Firm* — Muncy, Geissler, Olds & Lowe, P.C.

(57) ABSTRACT

A flexible temple structure includes a lens surface, a frame and two temples. The structure further includes two first connecting portions respectively provided on each of two corresponding ends of the frame, and two second connecting portions individually provided at one end of each of the temple. Each of the first connecting portion includes a main body, a projecting block, and a shaft post. Each second connecting portion includes an embedded mouth, an accommodating space, and a guide slot. The guide slot includes a fastening section, and a securing section connected with the fastening section. The projecting block/the shaft post are allowed to enter the accommodating space/the guide slot through the embedded mouth, and an appropriate resistance force is provided by the fastening section to allow the shaft post being operably retained into the securing section and the shaft post being pivoted in the securing section.

7 Claims, 12 Drawing Sheets

FLEXIBLE TEMPLE STRUCTURE

FIELD OF THE INVENTION

The present invention is related to a flexible temple structure, particularly to a flexible temple structure which is assembled and disassembled easily.

BACKGROUND OF THE INVENTION

In a conventional eyeglass, a frame and a temple are generally fixed by a screw, and force intensity required for rotating the temple is then adjusted by increasing or decreasing the locking strength of the screw. The drawback of such a kind of mounting means is the gradually loose screw and the resulted incapability of connecting the temple to the frame firmly, even swinging the temple depending on gravity, taking place after folding/unfolding the eyeglass several times. When this problems occurs, it is necessary for a user to tighten the screw again, and thus, inconvenient for use.

For overcoming the above problem, an eyeglass with easily mounted frame presently disclosed in Taiwan patent no. M463361, for example, is just a screwless eyeglass. In that patent, the fastener is mainly utilized to pass through one end of the frame, and the fastener is formed thereon with two pivots. The pivots are then pivotally connected to corresponding pivot holes on temples, such that the fasteners may be pivoted relative to the pivot holes, so as to achieve the object of folding the frame. The problem of loose screw may be overcome, because appropriate tightness between the pivot and the pivot hole may be set in the manufacturing. In such a joining means, however, the fastener and the frame are joined in an extremely tight manner. The frame and the temple are dismounted with considerable difficulty, once mounted together. The eyeglass structure provided by that patent is incapable of meeting the requirement when the temple is damaged or the change of temple style is desired by the user. Thus, how to improve with respect to the drawback of prior art is truly the problem to be overcome by the industry desirably.

SUMMARY OF THE INVENTION

It is one object of the present invention to solve the problem of difficulty in mounting and dismounting the frame and temples of the conventional screwless eyeglass.

For achieving the above object, the present invention, the present invention provides a flexible temple structure including a lens surface, a frame surroundingly provided on the periphery of the lens surface, and two temples respectively connected to two ends of the frame, two sides of the lens surface being defined as a front face and a back face, characterized in that the flexible temple structure includes two first connecting portions respectively provided on each of two corresponding ends of the frame, and two second connecting portions individually provided at one end of each of the temples. Each of the first connecting portions includes a main body provided toward the back face of the lens surface, a projecting block extending toward the back face of the lens surface from the main body, and a shaft post radially provided on two ends of the projecting block. Each of the second connecting portions includes an embedded mouth, an accommodating space communicated with the embedded mouth, and a guide slot provided at two sides of the accommodating space. The guide slot includes a fastening section, and a securing section connected with one end, far away from the embedded mouth, of the fastening section.

In this case, the projecting block/the shaft post are allowed to enter the accommodating space/the guide slot, respectively, through the embedded mouth, as well as an appropriate resistance force is provided by the fastening section to allow the shaft post being operably retained into the securing section and the shaft post being pivoted in the securing section.

Further, one side of each second connecting portion, where the embedded mouth is provided, is defined as an inner edge. When the inner edge and the lens surface are opposite to each other side by side, the projecting block/the shaft post are allowed to pass through the embedded mouth, and enter the accommodating space/the guide slot, respectively.

Further, one side of each second connecting portion, far away from the inner edge, is defined as a stopping edge. When the temple is pivoted about the shaft post and approximately perpendicular to the lens surface, the stopping edge is abutted against the main body.

Further, the contact face between the stopping edge and the main body is a curved face.

Further, the width of an opening of the fastening section is narrowed gradually in a direction toward the securing section, the securing section being a circular hole corresponding to the shaft post.

Further, the shaft post is symmetrically provided on two corresponding ends of the projecting block.

Further, the shaft post is asymmetrically provided on two corresponding ends of the projecting block.

Therefore, the present invention provides, in comparison with prior art, advantageous effects as follows.

1. The projecting block and the shaft post of the first connecting portion of the present invention may be located into the accommodating space and the guide slot of the second connecting portion, and the first connecting portion may be driven by the user to push the shaft post into the securing section from the fastening section of the guide slot, such that the fastening connection is formed between the shaft post and the securing section. Moreover, the shaft post may be pivoted relative to the securing section, whereby the flexible temple structure which is assembled and disassembled easily is realized.

DETAILED DESCRIPTION OF THE PREFERRED EMBODIMENTS

Figure 1:
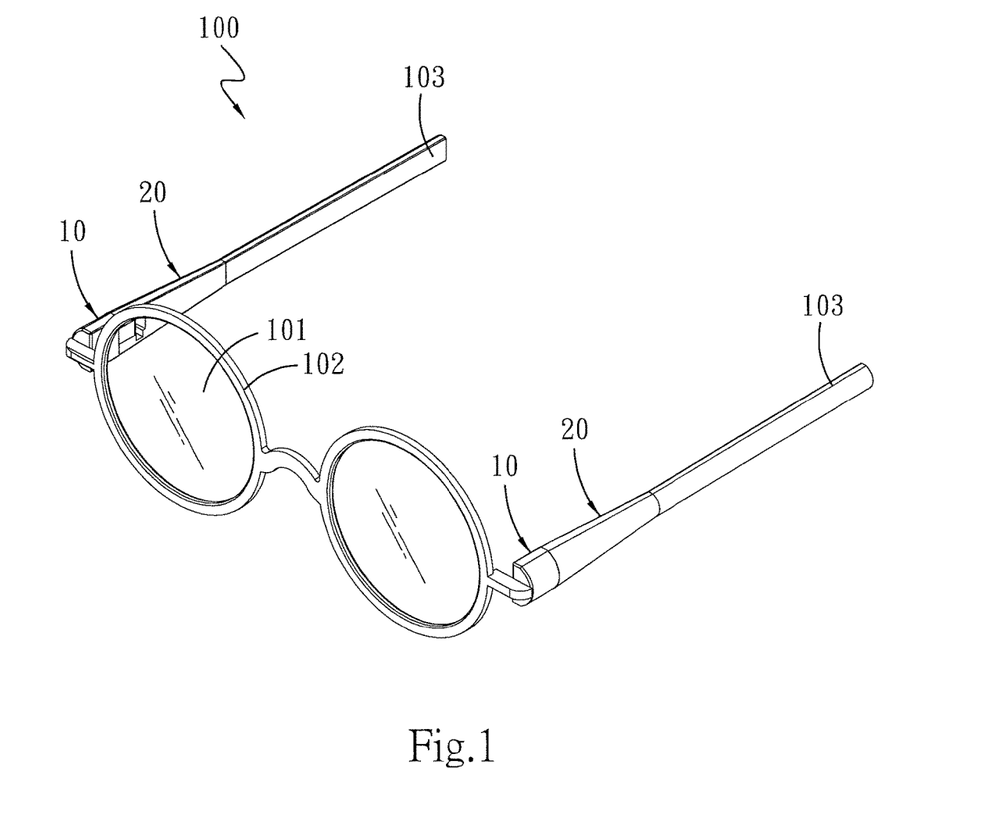
FIG. 1 is a perspective view of an eyeglass structure of the present invention with temples being unfolded.
Figure 2:
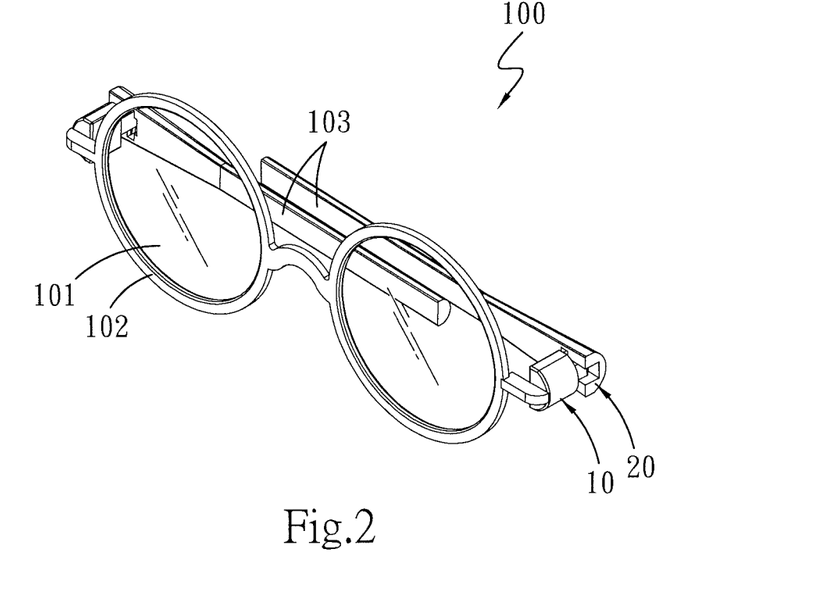
FIG. 2 is a perspective view of the eyeglass structure of the present invention with the temples being folded.
Figure 3:
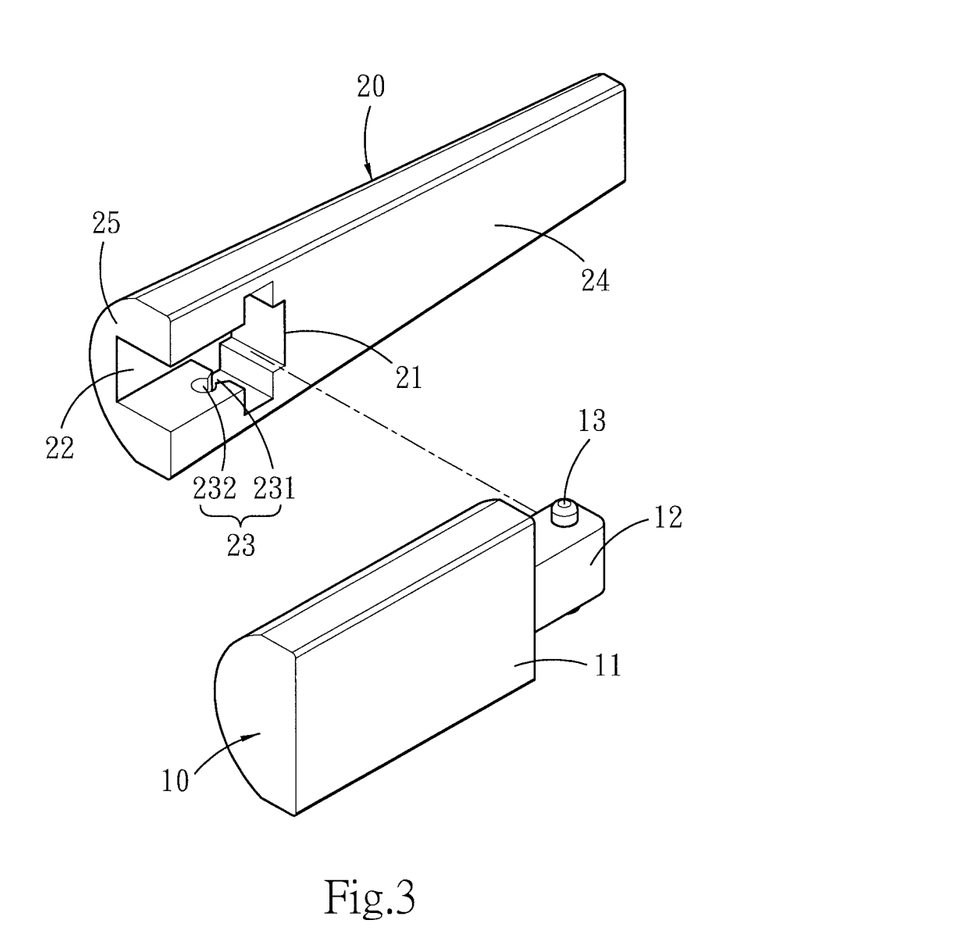
FIG. 3 is an exploded perspective view according to a first embodiment of the present invention.
Figure 4:
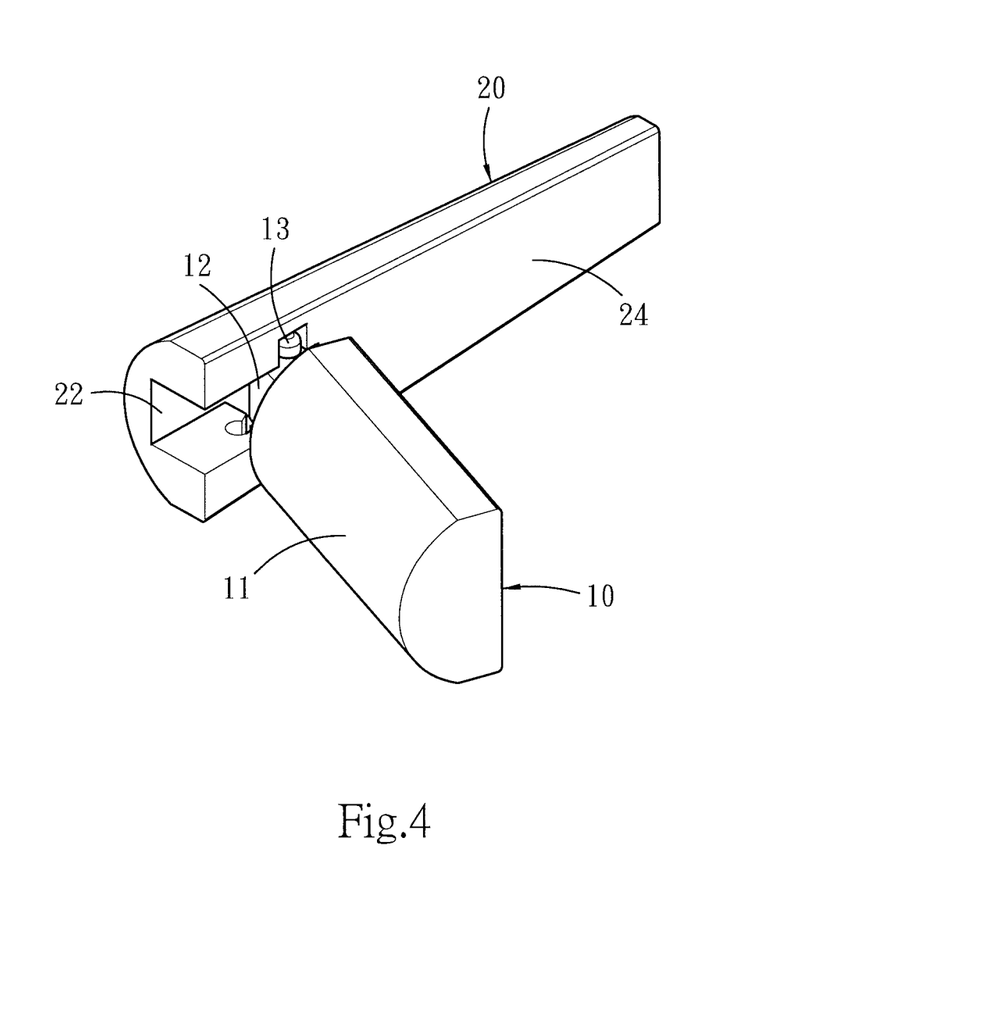
FIG. 4 is an assembled perspective view according to the first embodiment of the present invention.
Figure 5:
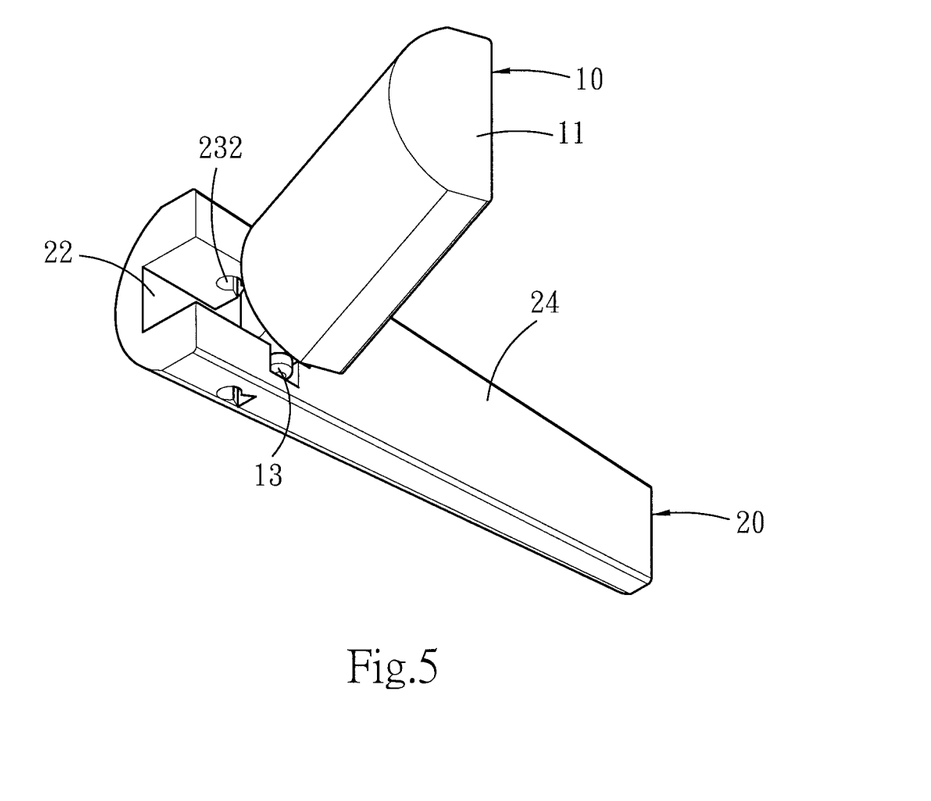
FIG. 5 is an assembled perspective view in another angle of view according to the first embodiment of the present invention.
Figure 6:
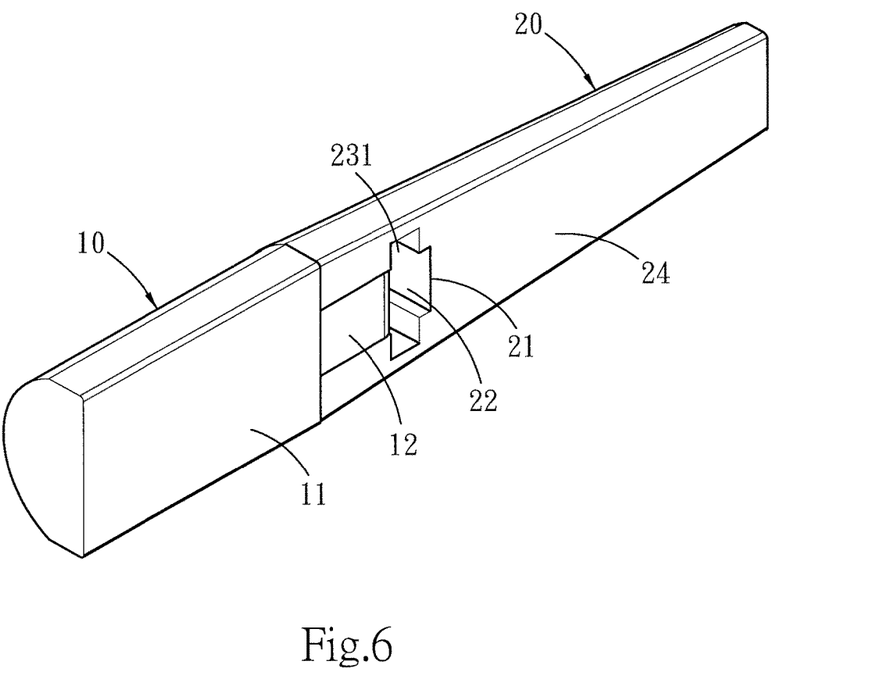
FIG. 6 is an assembled perspective view according to the first embodiment of the present invention with the temples being unfolded.

Referring to FIGS. 1 and 2, the technology of the present invention is illustrated. The present invention provides a flexible temple structure 100. The flexible temple structure 100 may be used in a near-sighted eyeglass, presbyopic glass and so on, but not limited herein. The flexible temple structure 100 includes a lens surface 101, a frame 102 surroundingly provided on the periphery of the lens surface 101, and two temples 103 respectively connected to two ends of the frame 102, two sides of the lens surface 101 being defined as a front face and a back face. In the present invention, the term "back face" is referred to one side on which a user wears the eyeglass, while the term "front face" is referred to one side toward which the line of sight of the user wearing the eyeglass is directed.

Referring to FIGS. 3-6, the flexible temple structure 100 includes two first connecting portions 10 respectively provided on each of two corresponding ends of the frame 102, and two second connecting portions 20 individually provided at one end of each of the temples 103. In more detail, each first connecting portion 10 includes a main body 11 provided toward the back face of the lens surface 101, a projecting block 12 extending toward the back face of the lens surface 101 from the main body 11, and a shaft post 13 radially provided on two ends of the projecting block 12. In this embodiment, the projecting block 12 is extended out along a long axis of the main body 11, while the shaft post 13 is erectedly provided on the projecting block 12 radially with respect to the long axis of the main body 11, in which the projecting block 12 and the shaft post 13 are combined as a T-like structure.

Each second connecting portion 20 includes an embedded mouth 21, an accommodating space 22 communicated with the embedded mouth 21, and a guide slot 23 provided at two sides of the accommodating space 22. The guide slot 23 includes a fastening section 232, and a securing section 231 connected with one end, far away from the embedded mouth 21, of the fastening section 232. In this embodiment, the shaft post 13 is symmetrically provided on two corresponding ends of the projecting block 12, so as to balance out the force applied to the projecting block 12 in use, and then reduce variation in degree of wear between the two ends.

In another embodiment, the shaft post 13 may be asymmetrically provided on two corresponding ends of the projecting block 12, so as to avoid the user to insert the shaft post 13 in the wrong direction.

Figure 7:
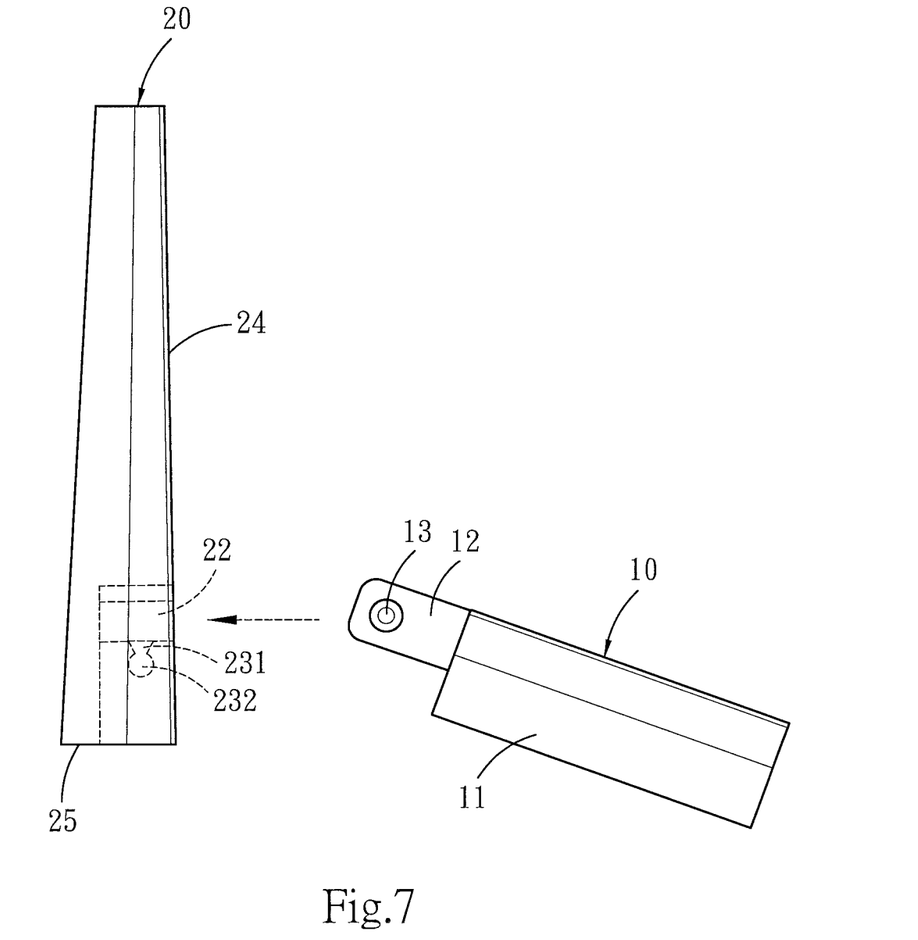
FIGS. 7 and 8 are diagrams illustrating states of the first embodiment of the present invention is use.
Figure 8:
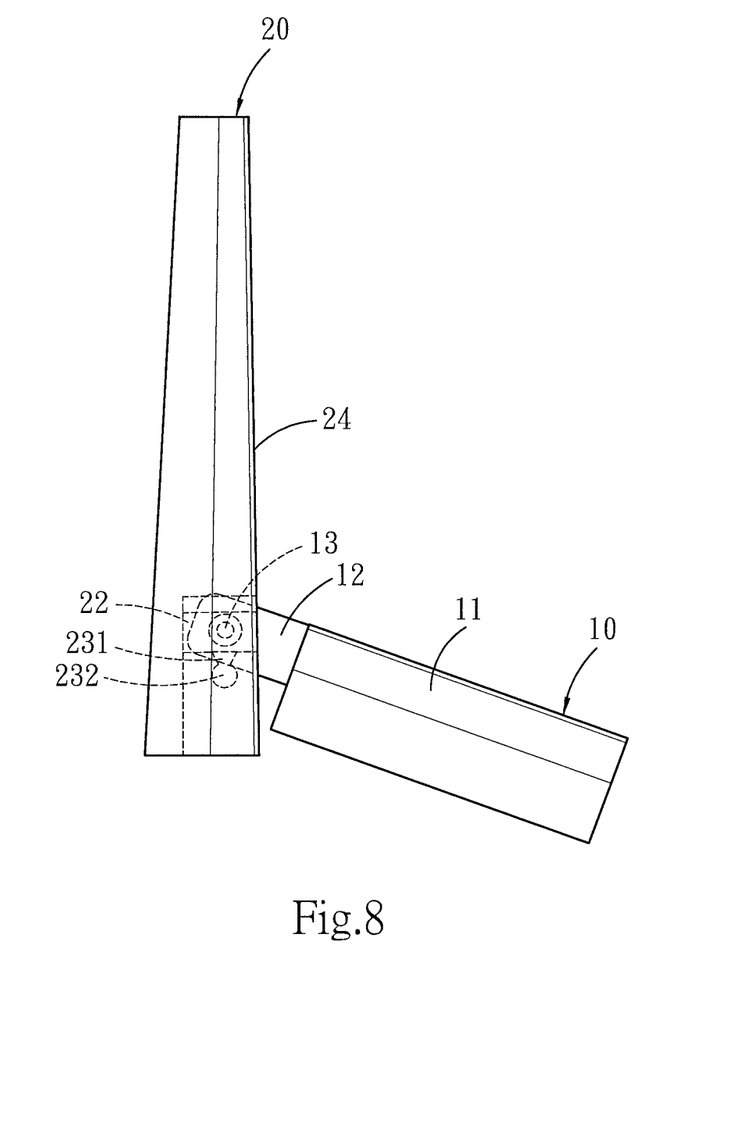
Figure 9:
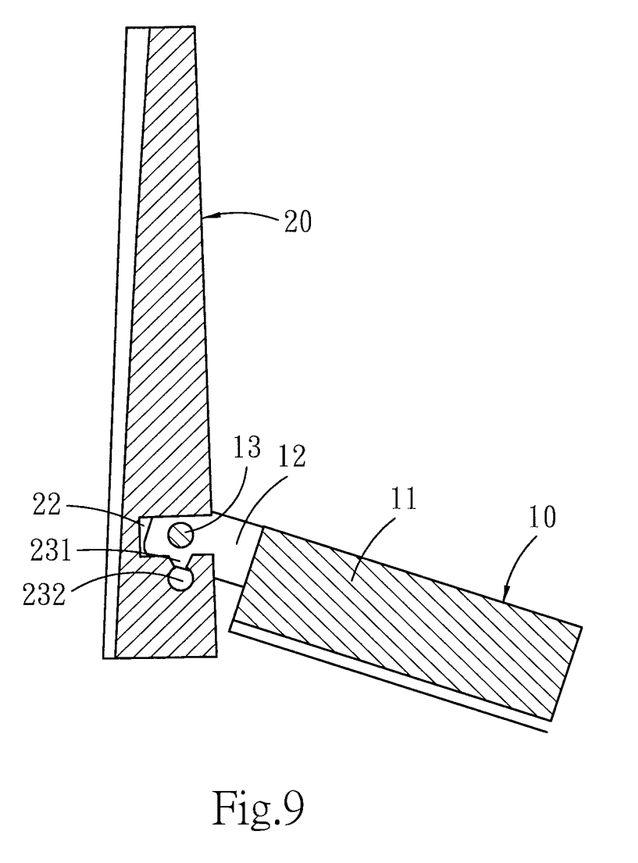
FIG. 9 is a cross section view of FIG. 8.
Figure 10:
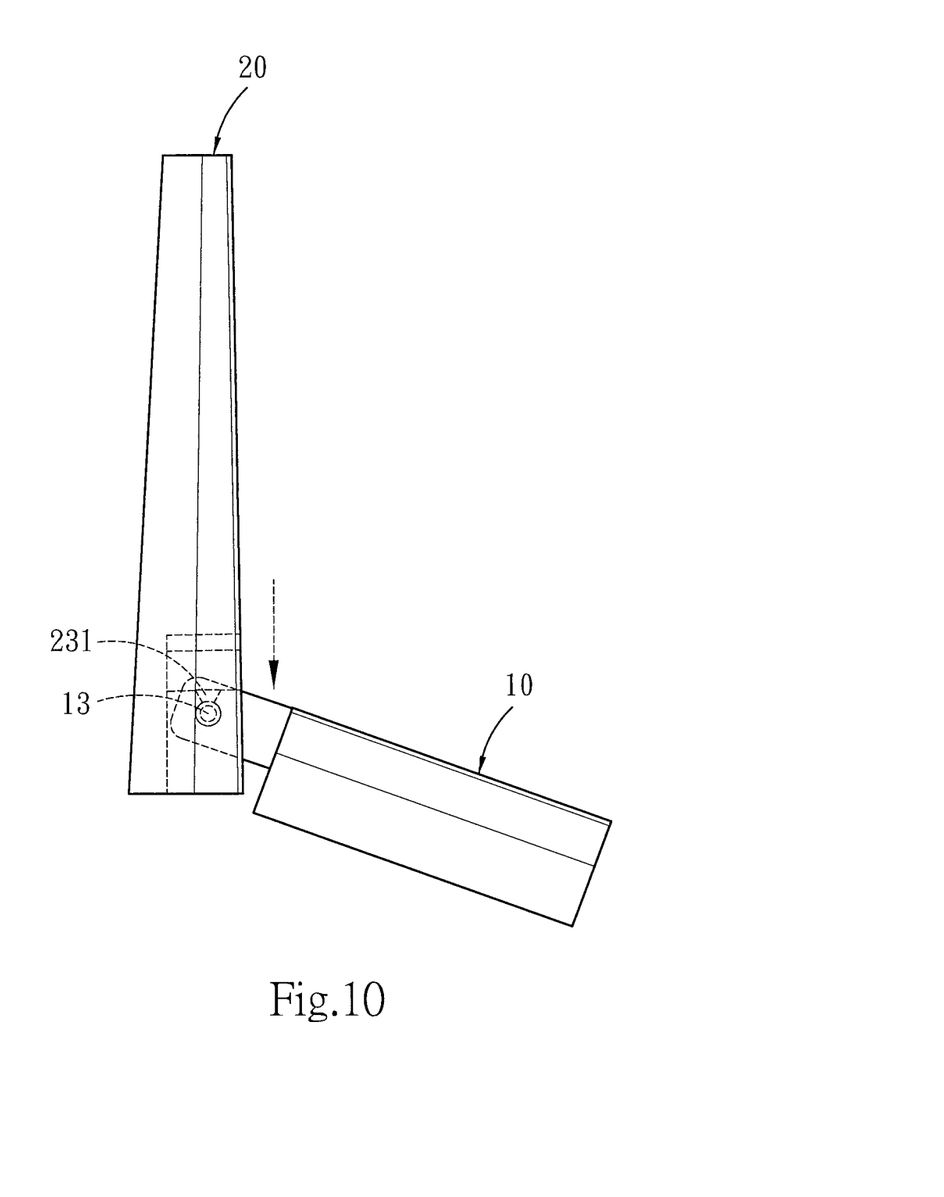
FIG. 10 is a diagram illustrating another state of the first embodiment of the present invention is use.
Figure 11:
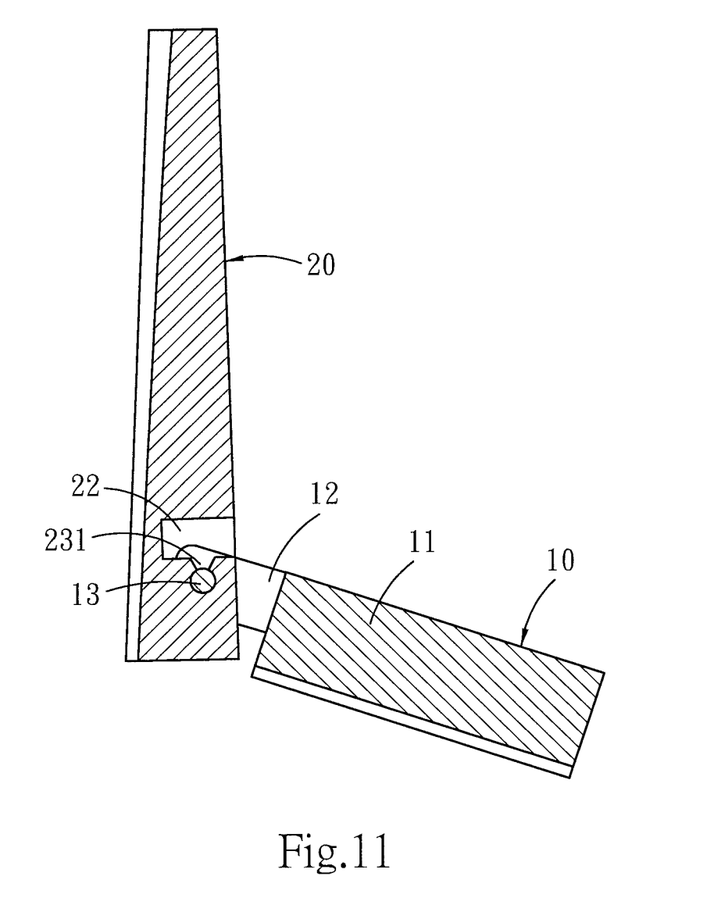
FIG. 11 is a cross section view of FIG. 10.
Figure 12:
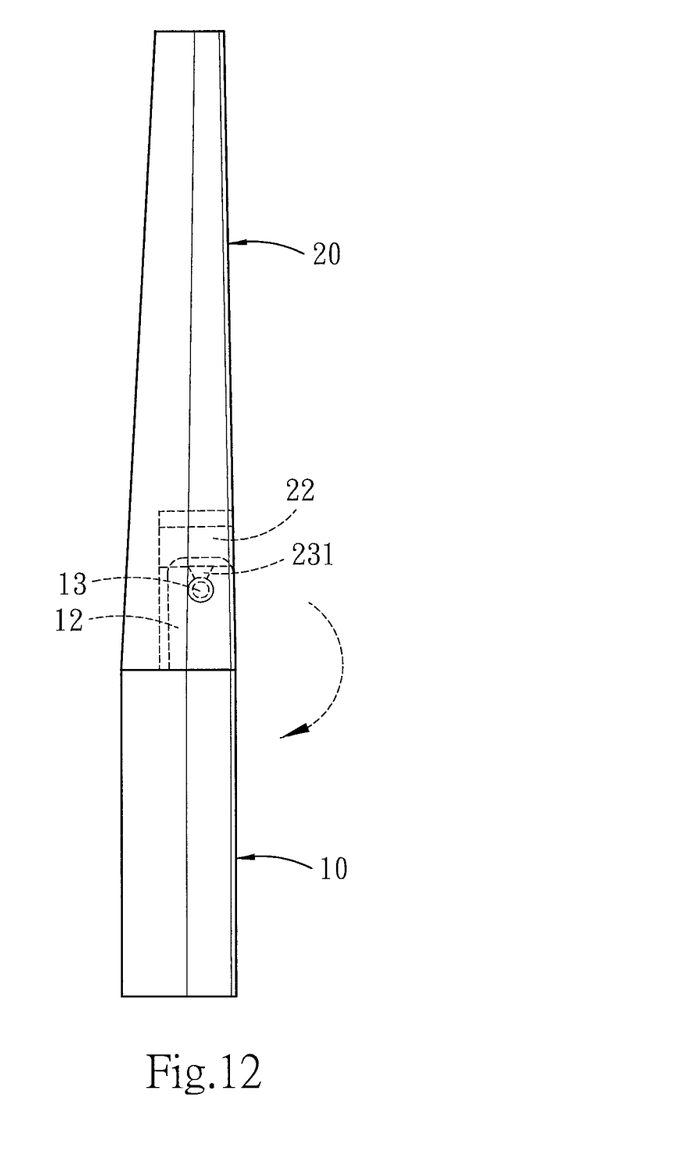
FIG. 12 is a diagram illustrating a state of the first embodiment of the present invention is use.

The method for the use of the present invention is described below. Firstly, referring to FIGS. 7-9, the projecting block 12/the shaft post 13 are allowed to enter the accommodating space 22/the guide slot 23, respectively, through the embedded mouth 21. Subsequently, referring to FIGS. 10 and 11, an appropriate resistance force is provided by the fastening section 232 to allow the shaft post 13 being operably retained into the securing section 231, and the shaft post 13 being pivoted in the securing section 231. Finally, referring to FIG. 12, the first connecting portion 10 may be rotated to a position where the first connecting portion 10 is juxtapose with the second connecting portion 20. In this embodiment, the width of the opening of the fastening section 232 is narrowed gradually in a direction toward the securing section 231. The securing section 231 is a circular hole corresponding to the shaft post 13. The term "appropriate resistance force" in the present invention is directed to a force required for pushing out the first connecting portion 10 in a direction toward the securing section 231 and then enabling the shaft post 13 to enter the fastening section 232 from the securing section 231 after passing the projecting block 12/the shaft post 13 through the embedded mouth 21 by the user. The appropriate resistance force is allowed for the shaft post 13 not to move between the securing section 231 and the fastening section 232 arbitrarily during the normal use of the flexible temple structure 100. Such a resistance force may be specifically realized by the first connecting portion 10 and the second connecting portion 20 made of resilient plastic or metal and the adjustment of increasing or decreasing the width of the fastening section 232.

On account of the above structure, the projecting block 12/the shaft post 13 of the present invention may be located into the accommodating space 22/the guide slot 23 of the shaft post 13, and the first connecting portion 10 may be driven by the user to push the shaft post 13 into the securing section 231 from the fastening section 232 of the guide slot 23, such that the fastening connection is formed between the shaft post 13 and the securing section 231. Moreover, the temple 103 is folded and rotated in conjunction with the pivoting of the shaft post 13 relative to the securing section 231. Thereby, the flexible temple structure 100 which is assembled and disassembled easily is realized.

In addition, one side of each second connecting portion 20, where the embedded mouth 21 is provided, is defined as an inner edge 24. When the inner edge 24 and the lens surface 101 are opposite to each other side by side, the projecting block 12/the shaft post 13 are allowed to pass through the embedded mouth 21, and enter the accommodating space 22/the guide slot 23, respectively. Oppositely, one side of each second connecting portion 20, far away from the inner edge 24, is defined as a stopping edge 25. When the temple 103 is pivoted about the shaft post 13 and approximately perpendicular to the lens surface 101, the stopping edge 25 is abutted against the main body 11. Preferably, the contact face between the stopping edge 25 and the main body 11 is a curved face, so as to reduce wear.

What is claimed is:

1. A flexible temple structure comprising a lens surface, a frame surroundingly provided on the periphery of said lens surface, and two temples respectively connected to two ends of said frame, two sides of said lens surface being defined as a front face and a back face, characterized in that said flexible temple structure comprises:

two first connecting portions respectively provided on each of two corresponding ends of said frame, each of said first connecting portions comprising a main body provided toward the back face of said lens surface, a projecting block extending toward the back face of said lens surface from said main body, and a shaft post radially provided on two ends of said projecting block; and two second connecting portions individually provided at one end of each of said temples, each of said second connecting portions comprising an embedded mouth, an accommodating space communicated with said embedded mouth, and a guide slot provided at two sides of said accommodating space, said guide slot comprising a fastening section, and a securing section connected with one end, away from said embedded mouth, of said fastening section, wherein an opening of said fastening section is opened perpendicularly to said embedded mouth, and a width of said opening of said fastening section is narrowed gradually in a direction toward said securing section;

wherein said projecting block and said shaft post sequentially enter said accommodating space and said guide slot through said embedded mouth, an appropriate resistance force is provided by said fastening section to allow said shaft post being operably retained in said securing section and said shaft post being pivoted in said securing section.

2. The flexible temple structure according to claim 1, wherein one side of each of said second connecting portions, where said embedded mouth is provided, is defined as an inner edge, and when said inner edge and said lens surface are opposite to each other side by side, said projecting block and said shaft post are allowed to pass through said embedded mouth, and enter said accommodating space and said guide slot, respectively.

3. The flexible temple structure according to claim 2, one side of each of said second connecting portions, distal from said inner edge, is defined as a stopping edge, and when said temple is pivoted about said shaft post and approximately perpendicular to said lens surface, said stopping edge is abutted against said main body.

4. The flexible temple structure according to claim 3, wherein a contact face between said stopping edge and said main body is a curved face.

5. The flexible temple structure according to claim 1, wherein a width of an opening of said fastening section is narrowed gradually in a direction toward said securing section, said securing section being a circular hole corresponding to said shaft post.

6. The flexible temple structure according to claim 1, wherein said shaft post is symmetrically provided on two corresponding ends of said projecting block.

7. The flexible temple structure according to claim 1, wherein said shaft post is asymmetrically provided on two corresponding ends of said projecting block.

* * * * *